March 29, 1938. A. R. KRAUSE ET AL 2,112,419
PROCESS OF AND APPARATUS FOR MAKING PATCHES
Filed Aug. 13, 1934 7 Sheets-Sheet 3
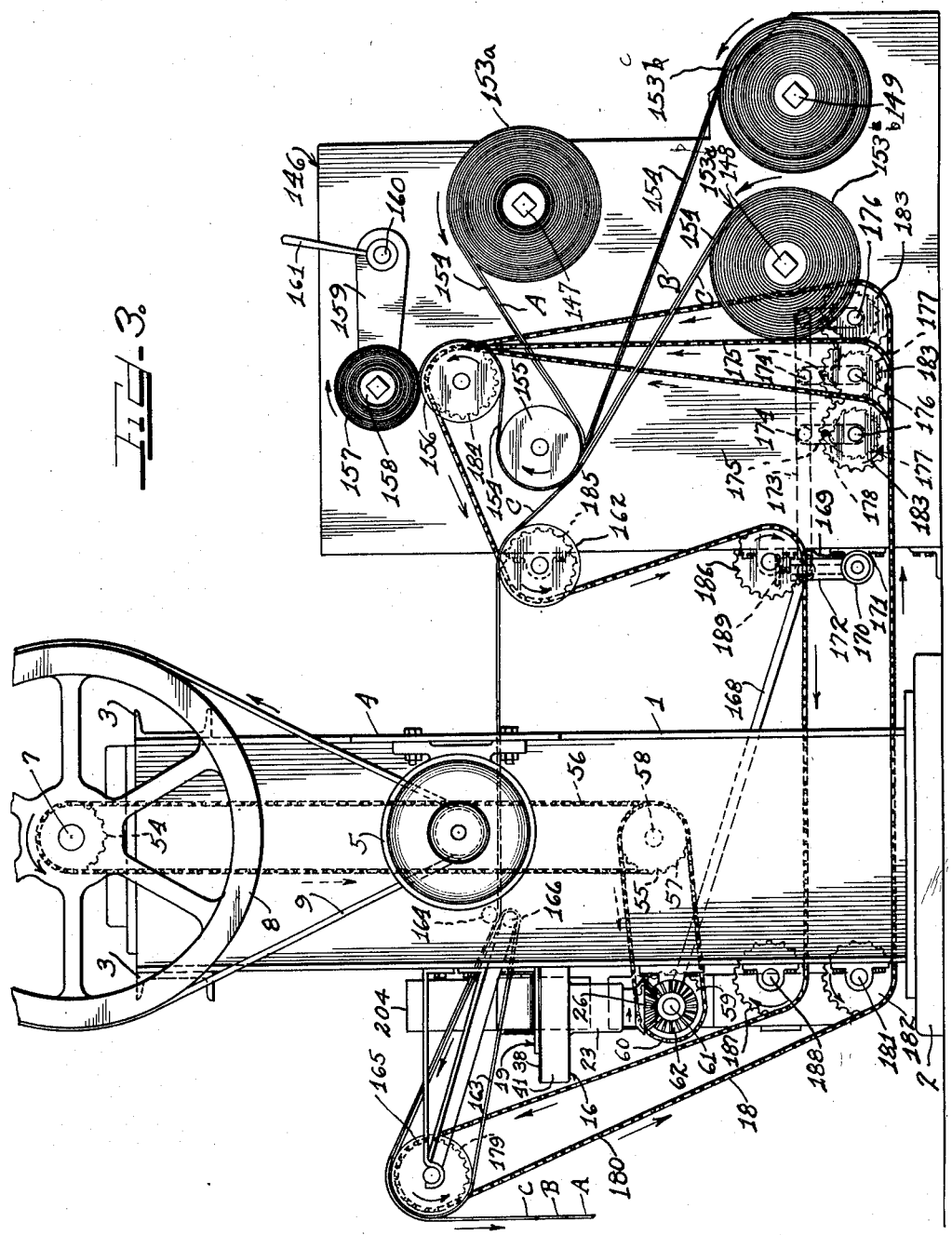
Inventors
Arnold R. Krause.
Howard O. Hutchens.
Julien J. Cullen.
C. Hirsch.

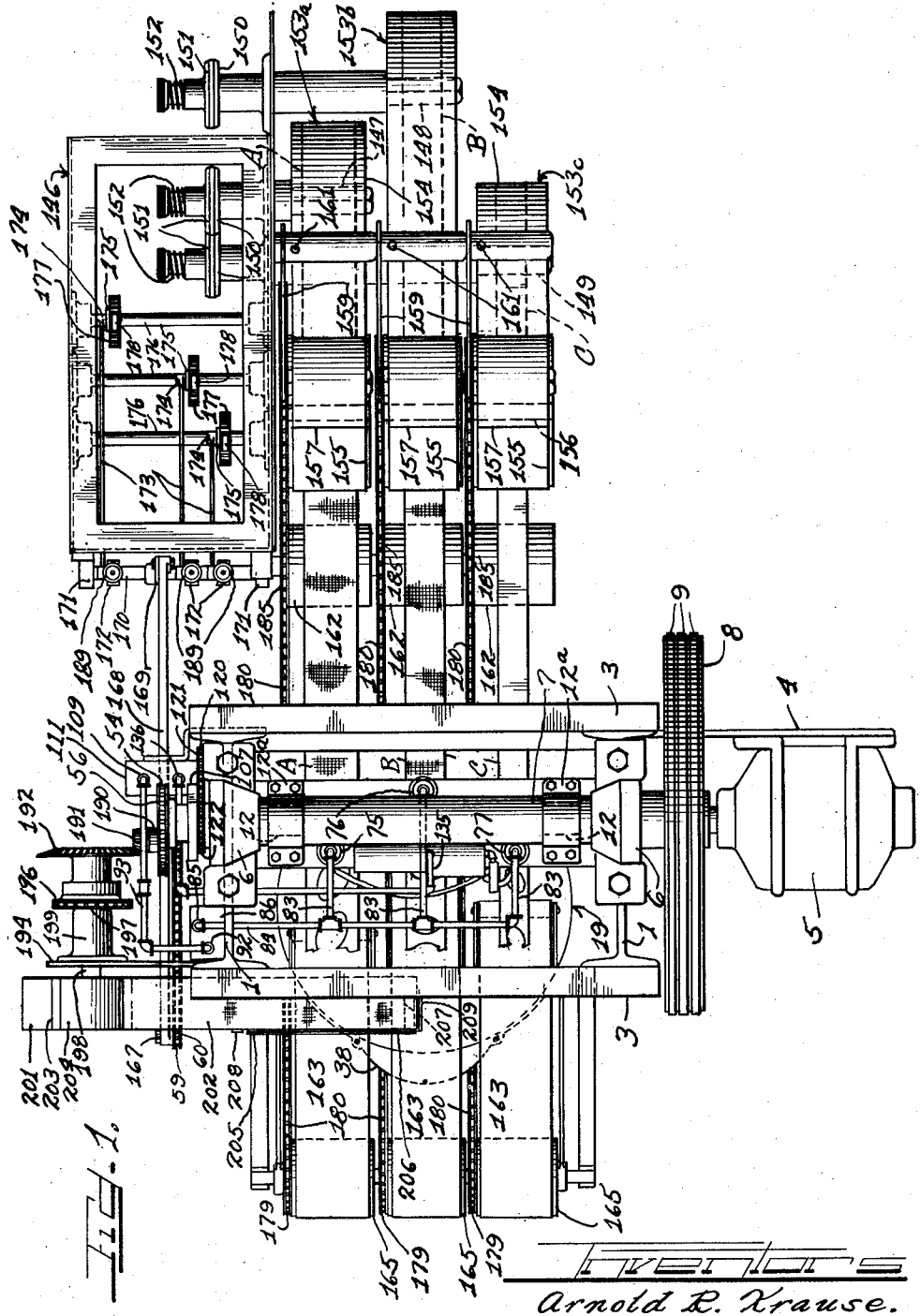

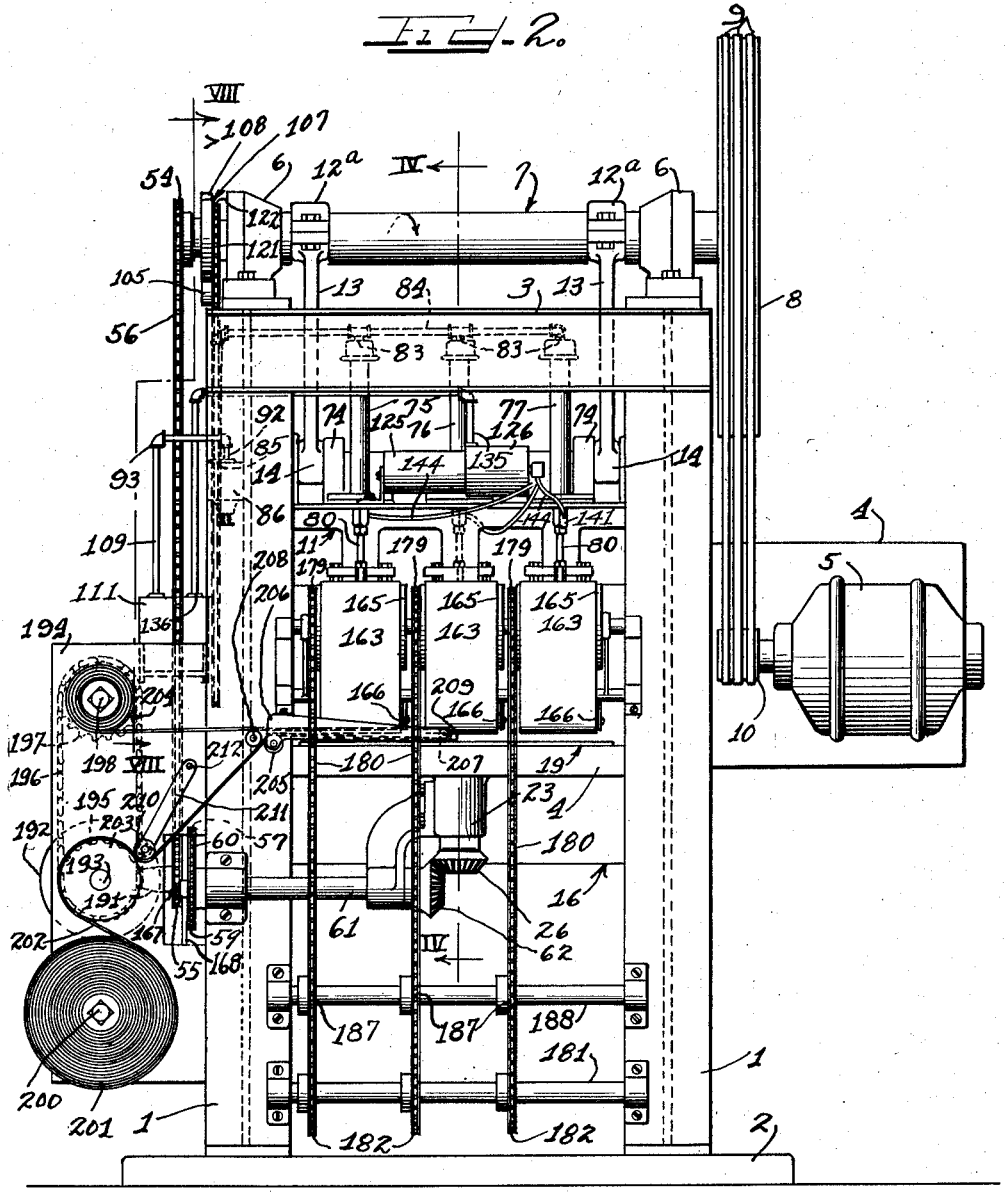

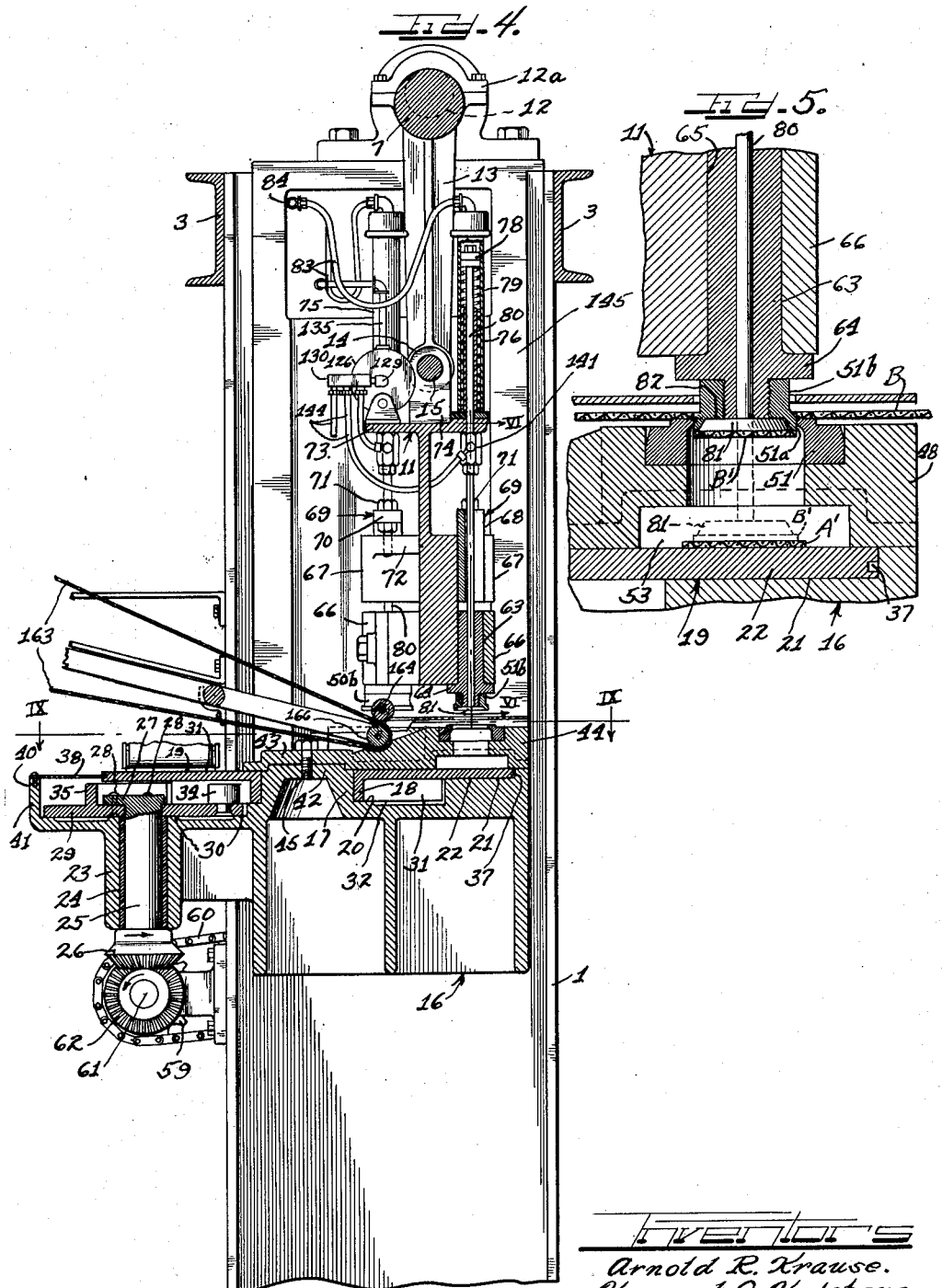

March 29, 1938. A. R. KRAUSE ET AL 2,112,419
PROCESS OF AND APPARATUS FOR MAKING PATCHES
Filed Aug. 13, 1934 7 Sheets-Sheet 5
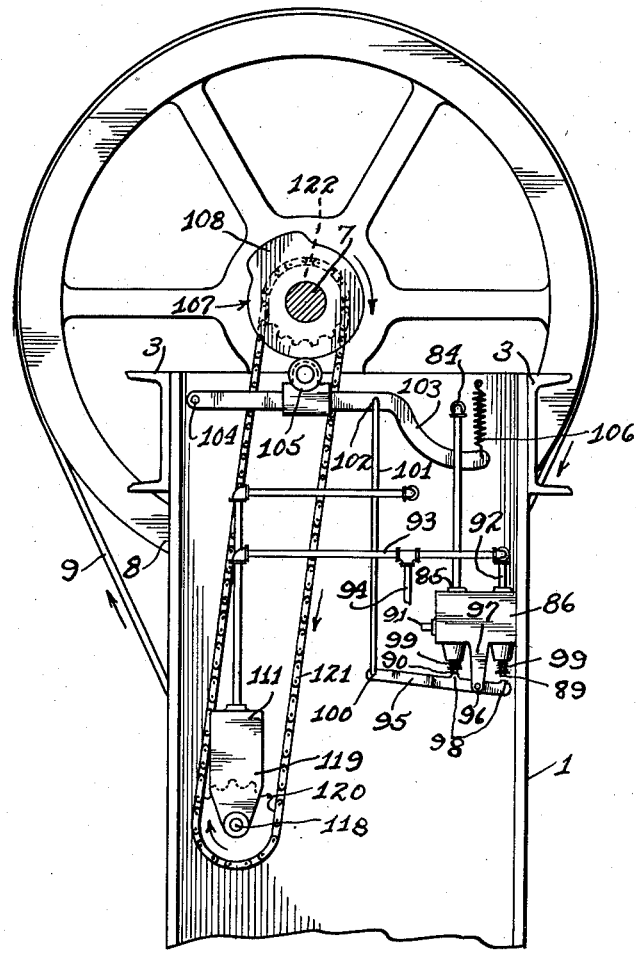
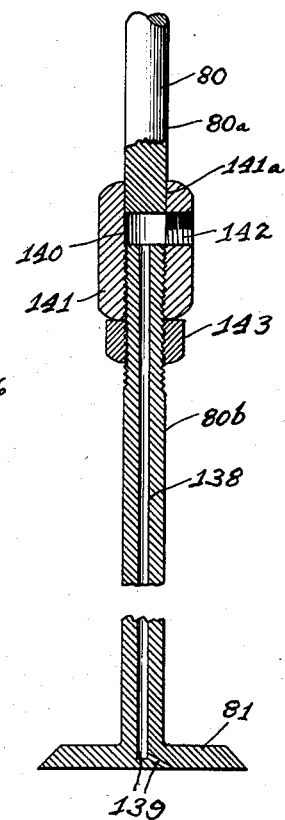
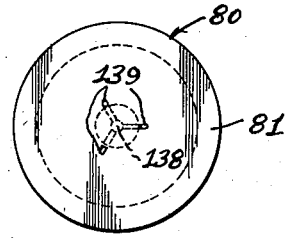
Inventors
Arnold R. Krause.
Howard O. Hutchens.
Julien J. Cullen.
A. C. Hirsch.

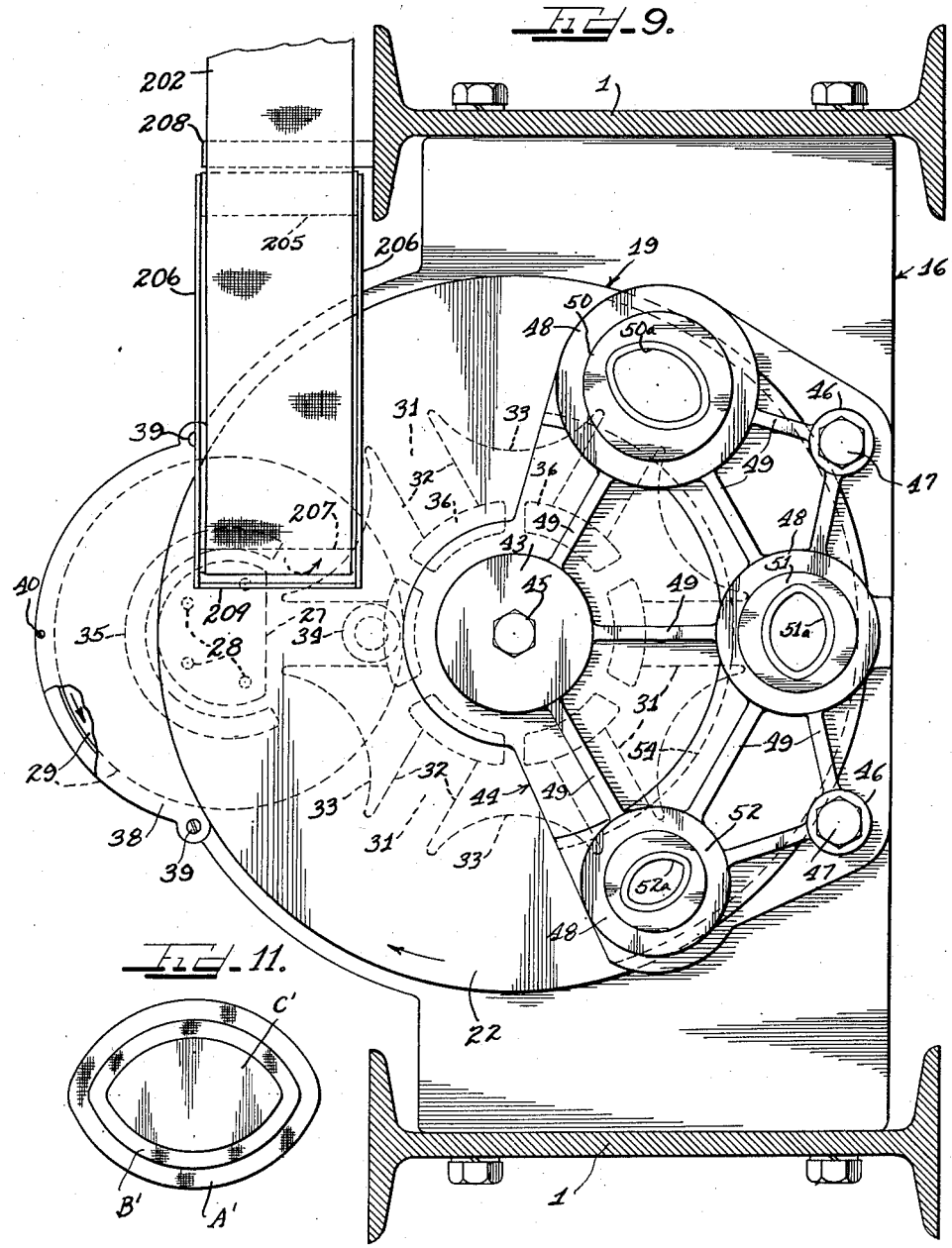

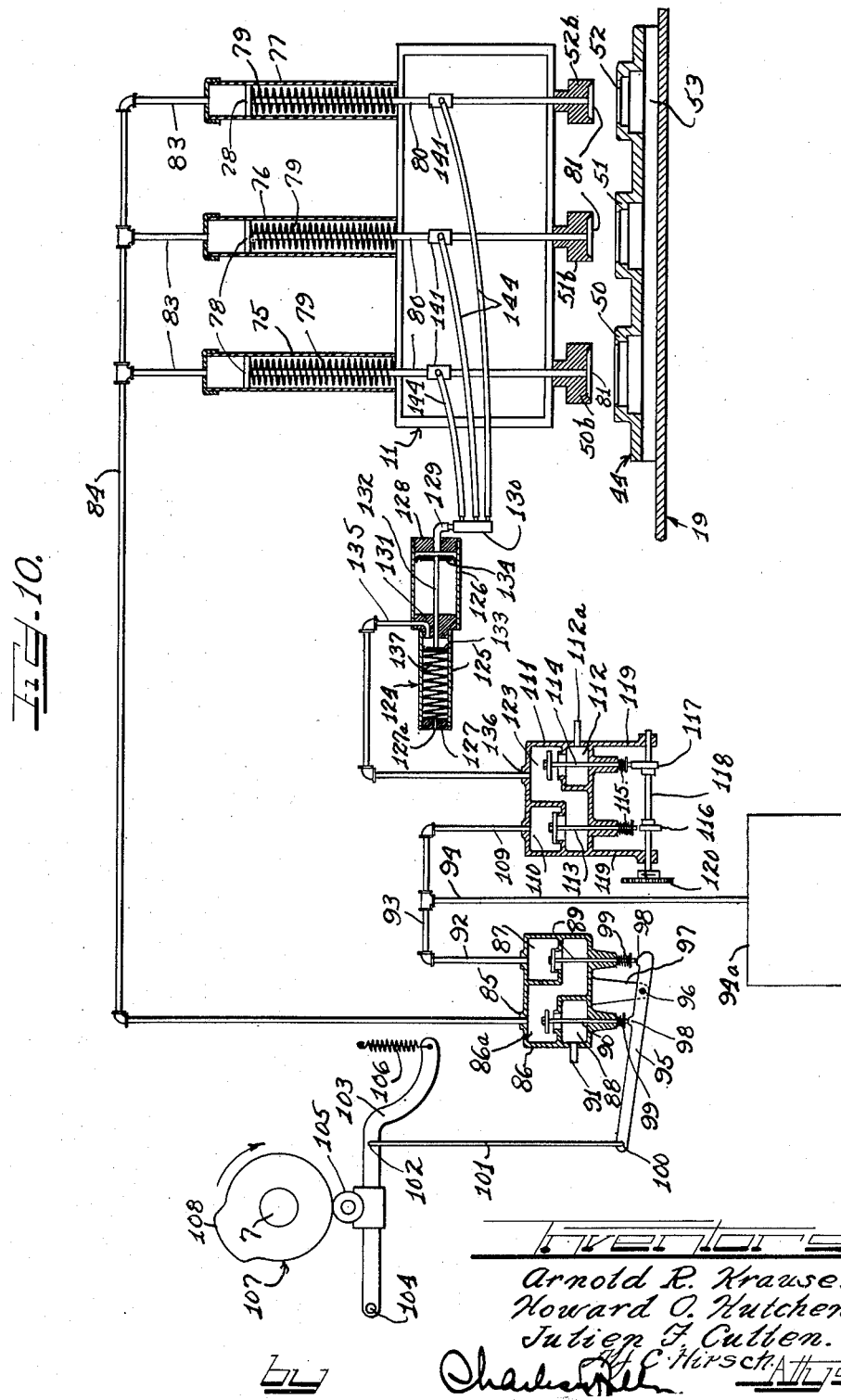

Patented Mar. 29, 1938

2,112,419

UNITED STATES PATENT OFFICE 2,112,419

PROCESS OF AND APPARATUS FOR MAKING PATCHES

Arnold R. Krause, Howard O. Hutchens, Julien F. Cullen, and Alf C. Hirsch, Eau Claire, Wis., assignors to Gillette Rubber Company, Eau Claire, Wis., a corporation of Wisconsin Application August 13, 1934, Serial No. 739,572

26 Claims. (Cl. 154—1)

This invention has to do with a process of and apparatus for making patches for inner tubes of tires and other pneumatic or like articles.

It is an object of the invention to provide an apparatus for making a multi-ply patch.

A further object of the invention is to employ a new process of making patches of the character referred to.

It is another object of the invention to provide means for automatically arranging the plies of a multi-ply patch in superimposed relation after cutting thereof.

A further object of the invention resides in the provision of means operating simultaneously to cut a plurality of plies, each to form a part of a different patch.

Another object of the invention resides in the provision of means for receiving a ply as the same is cut and shifting the same into a position to receive the ply to be superimposed thereon after the latter ply is cut.

Another object of the invention resides in the provision of means for forming a multi-ply patch including a turn-table arranged to conduct a ply into a position to receive the succeeding ply so that there may be no overlap if the plies are of identical size or that the overlap may be uniform if they are of different sizes.

A further object of the invention resides in the employment of pneumatic means for insuring the proper relative positioning of the plies as they are cut.

Another object of the invention resides in the provision of means for conveying the assembled patches from the mechanism for making the same.

It is a further object of the invention to provide means for synchronizing the various steps so that they may be performed in a predetermined relationship.

In accordance with the general features of the invention, there is provided a suitable source of power arranged to cut a plurality of plies to form part of a multi-ply patch. A turn-table is arranged to receive the cut plies, mechanism being provided to shift the table intermittently through an angle such as to bring each ply, with the exception of the last or top one of the patch, directly under the succeeding die so as to receive a ply to be cut from such succeeding die. A conveyor associated with the table removes the assembled patches. Pneumatic means is arranged to provide suction so as to cause the plies, immediately upon being cut, to adhere to positioning elements, which are caused to shift such plies while so adhering thereto to the turn-table. When this step is completed, the vacuum is removed and mechanism is made available to withdraw the positioning elements. When such elements are withdrawn, the table is actuated to move the cut plies to positions under the next succeeding dies.

The material from which the plies are cut is preferably in the form of tape or ribbon initially mounted upon rolls and fed intermittently so as to provide an uncut area after each cutting operation, after the positioning elements are sufficiently withdrawn. The various mechanisms are preferably operated from the same source of power, actuating instrumentalities therefor being so arranged as to cause each mechanism to operate in predetermined time relation to all of the other mechanisms.

The construction afforded by the invention is such as to provide a very compact machine whose parts are not complicated and which is capable of high production. The arrangement of the parts of the machine is such as to render the same readily available for inspection and accessible for repair, as well as for changing rolls of the material, so that repair or changing of rolls may be effected with a minimum of time loss.

Other objects and advantages of the invention will appear as the description proceeds.

The invention (in a preferred form) is illustrated in the drawings and hereinafter more fully described.

On the drawings:

Figure 1 is a plan view of an embodiment of the invention.

Figure 2 is a front elevation of the structure shown in Figure 1.

Figure 3 is a fragmentary side elevation of the structure of Figures 1 and 2.

Figure 4 is an enlarged fragmentary sectional view taken substantially in the plane designated by the line IV—IV in Figure 2, looking in the direction of the arrows.

Figure 5 is an enlarged fragmentary sectional view showing one of the die cutting mechanisms just after the completion of a cutting operation in full lines, and the deposit of the cut ply in dotted lines.

Figure 6 is an enlarged fragmentary sectional view of a ply depositing instrumentality, taken substantially in the plane designated by the line VI—VI in Figure 4, looking in the direction of the arrows.

Figure 7 is a bottom view of the instrumentality appearing in Figure 6.

Figure 8 is an enlarged fragmentary sectional view taken substantially in the plane designated by the line VIII—VIII in Figure 2, looking in the direction of the arrows, showing essentially the mechanism for operating and controlling the ply cutting instrumentalities.

Figure 9 is an enlarged fragmentary sectional view of a part of the die structure, and associated turntable and conveying structure, taken substantially in the planes designated by the line IX—IX in Figure 4, looking in the direction of the arrows.

Figure 10 is a schematic view of the essential parts of certain pneumatically controlled and controlling instrumentalities for the devices for properly positioning each ply after the same is cut.

Figure 11 is a plan view of a patch whose plies are assembled in accordance with the invention.

Referring now more particularly to the drawings, there is provided a framework comprising a pair of uprights 1 which may be in the form of I-beams resting on a platform 2 and connected at their flanges by cross members 3 which may be channel beams. The webs of the I-beams form substantially closed sides of a skeleton box-like structure. A bracket 4 extending preferably vertically outside of the box-like structure carries a motor 5 which may be operated from a suitable source (not shown) of electric energy. Mounted preferably on the top of the skeleton structure are bearings 6 in which a crank shaft 7 is journaled. The shaft 7 extends beyond the bearings 6, one such extension carrying a pulley 8 driven by belt or belts 9 from the motor pulley 10.

A crosshead 11 is mounted to be reciprocated between the uprights 1 by the shaft 7 and, to this end, the shaft 7 carries eccentrics 12 received in the bearings 12a of connecting rods 13, the latter at their opposite ends 14 being pivotally connected at 15 to the crosshead 11. It will accordingly be seen that when the motor is running, the connecting rods or pitmans 13 cause the crosshead 11 to reciprocate.

Supported by and between the uprights 1 is a base or bed 16 provided with an upstanding cylindrical boss 17 providing a journal for the hub 18 of a turntable 19, the base 16 at the lower end of the boss 17 is shouldered at 20 to provide a supporting bearing for the hub 18, the base 16 being further recessed at 21 to support the outer plate portion 22 of the turntable 19.

Eccentric of the boss 17 is a downwardly extending sleeve boss 23 lined with a bearing bushing 24 in which is rotatably fitted an arbor 25 carrying at its lower end a bevel gear 26. The upper end of the arbor 25 is flanged at 27 so as to overlie and is riveted, welded, screwed or otherwise suitably secured as at 28, to the actuating disc 29 of a Geneva gear mechanism. The base 16 at the sleeve boss 23 provides bearing surfaces 30 upon which the disc 29 is slidably supported, said disc, through its connection with the flange 27, serving to support the arbor 25 with its bevel gear 26. The disc 29 is moreover arranged to clear the bottom of the hub 18.

The turntable 19 forms the actuated element of the Geneva gear mechanism and to that end is provided with a plurality of equi-angularly spaced slots 31 radiating outwardly from the hub 18. Six such slots are illustrated on the drawings although it will be appreciated that any desired number of slots may be employed. The slots 31 terminate outwardly intermediate the hub and the outer periphery of the table 19, and the material 32 between adjacent slots 31 has its outer portion depressed inwardly in the form of an arc of a circle as at 33.

The disc 29 carries adjacent its outer extremity a roller 34 of a diameter less than the width of the slots 31. The disc 29 is also provided with an upstanding flange 35 of an extent preferably greater than a semi-circle with its open-side facing and preferably in symmetrical arrangement to the roller 34. The flange 35 is dimensioned so as to project partly beyond the outer periphery of the turntable 19 and to clear the same vertically so as to be movable thereunder. The radius of the outer periphery of the flange 35 is substantially the same as that of the arcuate depressions 33 in the turntable 19, and when any of such depressions have been turned to a position such that the axis of the arcuate flange 35 constitutes also the axis of that particular arcuate depression, the elements are arranged so that the roller 34 is just emerging from one of the slots 31, thereby ceasing to further rotate the table 19 so that the latter remains temporarily stationary. During the time that the roller 34 is out of cooperation with any of the slots 31, the cylindrical or arcuate portion 35 slides in engagement with the coaxially positioned arcuate depression 33 and forms a means for securely holding the turntable 19 in the same position until such time as the roller 34 engages in and commences to move the succeeding slotted portion of the table 19. After the arcuate portion 35 ceases to engage the coaxial arcuate depression 33 in the table 19, the latter is again rotated by the roller 34. In this way, the Geneva gear mechanism acts to cause an intermittent movement of the turntable 19 resulting from continuous movement of the disc 29.

Recesses 36 in the table 19 at the inner ends of the slots 31 are provided for the purpose of enabling the slots 31 to be milled.

To the end that dust and other foreign matter may be excluded from the Geneva gear mechanism, a major portion of the outer periphery of the table 19 fits slidably in a corresponding wall portion of the base 16, and said outer periphery of the table 19 is provided with a groove 37 in which is received an arcuate edge of a dust plate 38 secured at 39 and 40 to the arcuate housing portion 41 of the base 16 in which the Geneva gear disc 29 is supported.

The boss 17 of the base 16 has an upper reduced projection 42 fitting in the correspondingly recessed hub 43 of a sector-like die carrying plate 44. The parts 42 and 43 are bolted or otherwise suitably secured together as at 45. The plate 44 is extended outwardly beyond the periphery of the turntable 19, providing bolt hole bosses 46 and are bolted at 47 to the base 16 so as to be rigid therewith.

The die plate 44 carries near its outer periphery a plurality of bosses 48 connected to the hub 43 and bolt hole bosses 46 and together by reinforcing ribs 49. Dies 50, 51 and 52 are mounted in the respective bosses 48, and are preferably arranged so that their centers are equi-angularly spaced with respect to the center of the hub 43, and also so that adjacent dies are 60° apart. It is to be appreciated that the number of dies may be varied, the 60° relationship being chosen for enabling the dies to cooperate with a turntable arranged to have six intermittent motions for each revolution thereof, as illustrated. It is preferred that the angular relationship of adjacent dies be the same as that of adjacent slots 31, whatever number of slots or dies may be provided. In the illustrated embodiment of the invention, it is to be noted that each of the dies is formed to cut an oval piece of material as shown at 51a, 52a and 53a, respectively, and that, in the order just named, the size is reduced. As will be more fully explained hereinafter, the illustrated construction affords a means of producing three-ply patches, the patches being in stepped sizes with the largest lowermost and the smallest uppermost.

The shape of die may of course be varied as desired, and where it is desired that the contours of the respective plies, when assembled, be parallel with one another, and also non-circular, for example, as in the illustrated form of the invention, the dies should be arranged in the same relation to the center of the die plate 44. For example, it is to be noted, particularly in Figure 9, that the major axis of each of the die openings is tangent to a circle whose center is on the axis of the hub 43 and which passes through the centers of the die openings. It will further be noted that the minor axes of the respective die openings lie on radii of the plate hub 43.

The die plate 44 is formed to provide on its lower side a channel 53 of arcuate form and extending throughout so as to be open at its ends, and arranged to communicate with the respective die openings. It will thus be seen that when the material is cut by the dies, it may be forced or gravitate onto the turntable 19, which is thereupon actuated so as to rotate 60°, bringing the ply from the die 50 to a position under the die 51 and bringing the ply from the die 51 to a position directly below the die 52, so as to be ready to receive in proper assembled relation plies cut respectively from the latter two dies.

The drive for the Geneva gear actuating element 29 is accomplished as follows:

The main shaft 7, beyond one of the bearings 6, carries a sprocket 54 and the adjacent I-beam 1 carries a cooperating sprocket 55 driven from the sprocket 54 by a chain 56. A second sprocket 57 carried on the same shaft 58 as the sprocket 55 is driven by the sprocket 55 and itself drives a sprocket 59 by means of a chain 60. The shaft 61 carrying the sprocket 59 also carries a bevel gear 62 which meshes with the bevel gear 26. Thus when the motor 5 is in operation, the pulley, chain and gear instrumentalities afford a continuous drive of the Geneva gear actuating element 29, providing for intermittent rotary movement of the turntable 19.

The cutting instrumentalities for cooperating with the dies to cut the plies of material for making patches, together with the actuating mechanism therefor will now be described.

The crosshead 11 carries a plurality of cutters 50b, 51b and 52b in an arcuate relation arranged coaxially with the respective dies 50, 51 and 52, respectively, for cooperating therewith in cutting the different plies for producing the patches. Each cutter is preferably threaded onto the lower projecting portion of a sleeve 63 having a flange 64 at the upper extremity of the threaded portion and arranged to abut the bottom of the crosshead 11. The sleeve 63 fits in a vertical groove 65 in the crosshead 11 and is clamped onto the crosshead by the plate or bearing cap 66. The crosshead body provides a cylindrical housing 67 which is split and tightly receives the generally cylindrical hollow split stem 68 of a T member 69. The opposite arms 70 of the T head are bolted at 71 to opposed flanges 72 on the crosshead body so as to be secured thereto in adjusted relation.

The crosshead 11 has a superstructure 73 providing bearings 74 for the pivot shaft 15 and also carries in coaxial relation with the sleeve or housing portions 67 cylinders 75, 76 and 77, for operative association with the respective cutters 50b, 51b and 52b, respectively. In each cylinder is a piston 78 urged upwardly by a spring 79 and carrying a piston rod 80 which extends through the superstructure 73, the stem 68 of the T 69, and the sleeve 63, terminating therebelow in a head 81 which is formed to fit within the countersunk portion 82 of the respective cutter, and preferably lies flush with the bottom of the cutter when the piston 78 is in its uppermost position. Each tubular stem 68 is of such internal diameter as to afford clearance about the piston rod 80, the sleeve 63 affording a bearing as well as a guide for said rod.

Each of the cylinders 75, 76 and 77 is closed at its top except for a flexible tube 83 communicating with a stationary feeder pipe 84 which, in turn, communicates at 85 with a valve casing 86.

The casing 86 is provided with an intake chamber 87, an exhaust chamber 88, controlled respectively by spring pressed valves 89 and 90, and an intermediate chamber 86a with which the pipe 84 establishes direct communication at 85. The exhaust chamber 88 is provided with an exhaust tube 91, and an intake tube 92 communicating directly with the intake chamber 87 is connected to a feeder 93 which is at all times connected by a pipe 94 with a tank 94a or other source of compressed air.

The valves 89 and 90 are controlled by a lever 95 pivoted at 96 to a bracket 97 extending from the casing 86 and provided with projections 98 arranged to engage the lower ends of the stems of the valves 89 and 90 to raise the respective valves and control the lowering thereof with the assistance of the springs 99. The lever 95 extends beyond the casing 86 and has the end of its long arm pivotally connected at 100 to a link 101 whose opposite end is pivotally connected at 102 to a second lever 103. One end of the lever 103 is fulcrumed at 104 to the frame of the machine and, between the fulcrum 104 and the connection 102, carries a cam following roller 105. The lever 103 is urged by a spring 106 so as to cause the roller 105 to at all times engage the periphery of a cam plate 107 carried by the main shaft 7. The plate 107 is substantially round except for an arcuate portion 108 thereof, which is extended radially outward, the outer periphery of said extension being however preferably coaxial with the shaft 7 so that when the roller 105 is engaged with the outer periphery of the extension 108, the lever 103 is stationary. It will thus be seen that as the plate cam 107 rotates, the lever 103 and consequently the lever 95 are caused to have intermittent oscillations, causing intermittent reciprocation of the valves 89 and 90, which are arranged to be operated alternately.

The feeder 93 for compressed air is connected by a pipe or tube 109 to the intake compartment 110 of a second valve casing 111. The casing 111 is also provided with an exhaust chamber 112 and pipe 112a, said chambers 110 and 112 being controlled by valves 113 and 114, respectively, urged into closing positions by springs 115. At predetermined times, the valves 113 and 114 are moved into open positions by cams 116 and 117 carried by a cam shaft 118 journalled in brackets 119 extending from the casing 111. A sprocket 120 is carried by the shaft 118 and is driven by a chain 121 engaging about a driving sprocket 122 carried by the main shaft 7, as clearly seen in Figure 8. Thus when the motor 5 is operating, the valve controlling cam shaft 118 is driven by belt and pulley and chain and sprocket mechanism.

The casing 111 is provided with a third chamber 123 which is adapted to communicate with one or the other of the chambers 110 and 112, according to whichever is open.

The crosshead 11 also carries a device 124 providing coaxially arranged different sized cylinders 125 and 126. The smaller cylinder 125 is closed at its outer end as by a plug 127 having a vent 127a, the outer end of the larger cylinder 126 is closed by a plug 128, the latter being bored to tightly receive a tube 129, establishing communication between the interior of the cylinder 126 and a feeder 130.

A centrally bored plug 131 connects the adjacent ends of the cylinders 125 and 126, and receives a piston rod 132 carrying at one end a piston 133 fitting in the smaller cylinder 125 and at the other end a piston 134 fitting in the larger cylinder 126. The piston rod 132 is preferably of such length that it may be arranged with the smaller piston 133 adjacent the connecting plug 131 when the larger piston 134 is adjacent the end plug 128 of the larger cylinder 126. The connecting plug 131 is provided with an opening receiving an angle bend of a pipe 135 which communicates with the third chamber 123 of the casing 111 as at 136. The pipe 135 thus affords communication between the smaller cylinder 125 and the chamber 123. Between the smaller piston 133 and the outer plug 127 of the smaller cylinder 125 there is disposed a spring 137 which is preferably under compression so as at all times to urge the smaller piston 133 toward the connecting plug 131 and consequently the larger plug 134 toward the outer plug 128 of the larger cylinder 126.

Each of the piston rods 80, moving in the cylinders 75, 76 and 77 respectively, comprises upper and lower sections 80a and 80b. The section 80b is provided with an axial bore 138 which terminates in the base 81 where it is divided into a plurality of passages 139 so as to enable the bore 138 to communicate with the outside air at the bottom of the base 81. The sections 80a and 80b are spaced at 140 at the upper end of the bore 138. The section 80b is threaded at its upper end and receives an internally threaded sleeve 141 welded, brazed, or otherwise fastened at 141a to the lower end of the section 80a so as to depend therefrom. The sleeve is provided with a threaded opening 142 communicating through the space 140 with the bore 138. A nut 143, threaded on the rod 80, is screwed up tight against the sleeve 141 so as to hold the parts in proper assembly. The sleeve 141 serves also as an abutment engageable with the under part of the superstructure 73 of the crosshead 11 so as to limit the upward movement of the rod 80 caused by the spring 79 in the cylinder in which the rod 80 reciprocates. Of course it is to be noted that the lower end of the sleeve 63 and cutter mounted thereon also serve as a limiting means for the upward movement of the rod 80.

A flexible tube 144 extends from the tapped opening 142 in each sleeve 141 to the feeder 130.

The central bore and passages at the bottom of each piston rod 80 are provided for the purpose of enabling such bottom to provide suction for causing a cut ply to adhere to such bottom until the latter has moved to the lower extremity of its stroke as shown in dotted lines in Figure 5. Said bore and passages are also provided to enable the adhering ply to be released when the vacuum in such bore and passages is broken. The bottom 81 of each rod 80, as has hereinabove been pointed out, is arranged to lie substantially flush with the cutting edge of the respective cutter, and by clasping the cut ply by suction and holding the same to prevent it from turning, the ply is deposited so as to extend in the desired direction with respect to the other plies so that the contours of the various plies assembled to form a patch are either coincident or parallel, depending upon whether the plies are of the same or different sizes.

Each of the piston rods 80 is operated in the same manner as the others, and accordingly the following description of the operation of one of them will be understood to apply to all of them.

When the plate cam 107 is located substantially as shown in the various figures, the cutters 50b, 51b and 52b are in their upraised positions, the crank shaft eccentrics 12 which control the crosshead 11 being in their uppermost positions as shown. At this point, also, each piston 78 is in its upraised position and is being held in that position by the spring 79, since the valve 89 is closed, preventing compressed air from the feeder 93 from reaching the upper part of the cylinder in which the piston 78 is disposed. As will be seen in Figure 5, where the cutter is shown at the bottom of its stroke, said cutter is disposed slightly below the tape B from which it has cut the patch ply B'. Consequently it is desired that the suction to hold the ply B' to the base 81 of the rod 80 be effective at the time of cutting.

When the main shaft 7 makes slightly less than a complete half revolution, it will be clear from Figure 5 that the cutter 51b is about to cooperate with the die 51 in performing the cutting operation.

The sprocket 120 is arranged to make one revolution for every revolution of the main shaft 7. In Figure 10, it will be observed that the valve 113 is closed, and that the cam 116 controlling the same is arranged with its most eccentric portion extending away from the valve 113. It will be noticed moreover that the exhaust valve 114 is open, the cam 117 controlling the same being arranged with its most eccentric portion uppermost in engagement with the lower end of the valve. The cam shaft 118 rotates as shown by the arrow in Figure 10. The cams 116 and 117 are so arranged that the cam 117 will recede to such an extent as to allow the spring 115 to close the valve 114 at about the time that the cam 116 becomes effective to open the valve 113. This will occur by substantially the time that the main shaft 7 has made about a quarter revolution, the cutters approaching their cutting positions. The exhaust valve 114 being closed and the intake valve 113 being open, compressed air from the feeder 93 is admitted to the chamber 110, thence to the chamber 123, to the pipe 135 and into the inner end of the smaller cylinder 125. This compressed air forces the smaller piston 133 toward the outer end of the cylinder 125 against the resistance of the spring 137, causing the piston 134 to be drawn toward the connecting plug 131 and thus establishing a vacuum between the outer end plug 128 and the piston 134. Since the tube 129, feeder 130 and flexible tube 144, associated with the sleeve 141 establish communication between the outer part of the larger cylinder 126 and the bore of each piston rod 80, it will be evident that at the time the bottom 81 of each piston rod 80 is in engagement with the tape from which the ply is to be cut, the vacuum is effective to cause the ply to adhere to the bottom of the rod 80.

It will be noticed from Figure 10 that the elevated portion 108 of the cam 107 reaches the follower 105 substantially at the termination of one-half revolution of the main shaft 7. At this point, the cutters are at substantially the lower ends of their strokes, as shown in Figure 5, the cut plies adhering to the bottoms of the piston rods 80 by means of suction as heretofore explained. As rotation of the main shaft 7 is continued, the cutters commence to rise, but at the same time the elevated portion 108 of the cam 107 depresses the follower 105 and with it the levers 103 and 95, opening the intake valve 89 and allowing the spring 99 to close the exhaust valve 90. Thus a passageway through the chambers 87 and 86a to the feeder 84 is provided for compressed air from the compressed air feeder 93. The flexible tubes 83 conduct the compressed air from the feeder 84 to the cylinders containing the pistons 78, and this air directly forces each piston 78 downward, causing the piston rod 80 to move downward therewith until the lower limit of the respective rod is reached. In the case of the piston rod associated with the cutter 50b, the ply cut thereby and engaging the turntable 19 serves as the limit of the downstroke of the piston rod 80. In case of the piston rod associated with the cutter 51b, the upper surface of the ply cut by the cutter 50b and resting on the first ply will serve as the limiting means. In the case of the remaining piston rod associated with the cutter 52b, the upper of the three plies will be engaged by the bottom of the corresponding piston rods and limit the downward movement thereof.

The compressed air is operative substantially instantaneously to lower the piston rods 80, and it is desired that the air pressure be released and the vacuum broken practically immediately upon deposit of the various plies, so that the same will not adhere to the piston rods as the same are moved upward.

The time during which the pressure is effective is accordingly of short duration, as will become evident from the fact that the elevated portion 108 of the cam 107 is of relatively slight arcuate extent. Thus by the time the cutters are emerging upwardly from the cooperating dies, the elevated cam portion 108 passes beyond the follower 105, allowing the spring 106 to raise the levers 103 and 95 and allow the spring 99 to close the intake valve 89 and cause the exhaust valve 90 to be opened. Also at the time that the piston rods 80 are at the lower ends of their strokes, the cam shaft 118 has rotated to such an extent as to release the intake valve 113, allowing its spring 115 to close the same. The cam shaft 118 likewise has caused the cam 117 to open the exhaust valve 114. The air which is compressed between the smaller piston 133 and the connecting plug 131 of the cylinders 125 and 126 is thus freed to the atmosphere through the piping 135, and chambers 123 and 112, and the spring 137 being thus released expands and forces such air out so as to exhaust the same, at the same time moving the larger piston 134 in the larger cylinder 126 toward the outer end plug 128 through the space which previously was in vacuo. The vacuum thus collapsing, the bottom 81 of each piston rod 80 readily releases the ply previously adhering thereto.

At or shortly after the release of the plies by the piston rods 80, the exhaust valve 90 is opened and the intake valve 89 is closed as just previously explained, thereby establishing communication with the compressed air above each piston 78 with the atmosphere. Thus each spring 79 is released and is allowed to expand, forcing the piston 78 and consequently the piston rod 80 upward and forcing the compressed air out through the feeder 84 and chambers 86a and 88 and exhaust pipe 91 to the atmosphere.

The continued rotation of the main shaft 7 to the completion of the cycle commencing with the arrangement shown in Figure 10 brings the cutters again to their uppermost positions and the other parts to their positions at the beginning of the revolution of the main shaft 7 referred to, ready to repeat the cycle just described.

Each of the piston rods 80 is of course arranged so as not to rotate in the respective cutter, so as to insure proper positioning of each ply with respect to the plies to be associated therewith in the making of each patch.

A guide structure 145 is mounted on the inner side of each I-beam 1 to serve as a guide cooperating with the cross-head 11.

It is to be appreciated that Figure 10 is a schematic view, for the purpose of illustrating the operation of certain mechanisms. Insofar as the die and cutter instrumentalities are concerned, they may be considered as taken on an arcuate plane passing through the axes of the respective parts, since as previously described and elsewhere illustrated, the said parts are arranged in an arcuate series.

Adjacent the framework including among other parts the I-beams 1 and channel beams 3, is a supporting frame 146 in which, for illustrative purposes only, three tape carrying spindles 147, 148 and 149 are journaled. The bearings carrying said spindles are provided with friction discs 150. The inner ends of the spindles pass through loosely mounted friction discs 151 which are pressed against the respective discs 150 by springs 152, thus providing a frictional drag upon the rotation of the respective spindles.

The spindle 147 adjacent the inner side of the frame 146 carries a roll 153a consisting of alternate layers of any suitable preferably plain fabric 154 which is outermost and preferably rubber coated or impregnated tape A. The spindle 148 is extended beyond the spindle 147 and carries a second roll 153b of alternate layers, the outermost of which may be fabric 154 similar to that described in connection with the spindle 147, and the inner of which is preferably fabric B which may be of the same material as that designated by the reference character A. The third spindle 149 extends beyond the spindle 148 and carries a third roll 153c whose outer layer is designated 154 and may be of the same material as the layers 154 previously referred to. The inner layer on the spindle 149 is preferably of rubber such as gum rubber, designated C. It is to be noted that the layers or tapes A, B and C are of decreasing width in the order identified. The width of the respective tapes is such as to enable the same to cooperate with the respective die and cutter instrumentalities so as to provide from the widest tape A the largest ply A' which is to form the bottom of the patch, from the tape B of intermediate width, the second and intermediate ply B', and from the narrowest tape C, the third or smallest ply C'. When the plies are assembled, they form a patch which is illustrated in Figure 11.

Idler rolls 155 are arranged in the planes of the respective rolls 153a, 153b and 153c, respectively, and at said rolls 155 the outer layer 154 is separated from the inner layer of the various rolls of tape. The tape 154 is trained upwardly and rearwardly over the rolls 155, passed about a second set of idler rolls 156, and are wound in spiral rolls 157 on a spindle 158 mounted on the free end of a lever 159 pivoted at 160 to the frame 146. The rolls 157 rest and are held by gravity on the idler rolls 156, and when the ends of the rolls of tape 154 are reached, the lever 159 may be swung upwardly by pressing rearwardly and downwardly upon the handle 161 carried thereby, to permit removal of the roll 157 and attachment of the forward ends of new rolls of tape 154.

A set of rolls 162, located forwardly of the idler rolls 155, is arranged to receive the respective tapes A, B and C, and from the rolls 162, the tapes extend preferably horizontally so as to pass over the dies and forwardly over the turntable 19. Each cut tape is drawn forwardly between a belt 163 and a cooperating roll 164. The belt 163 is trained about a forwardly disposed roll 165 and a rearwardly disposed roll 166 below the roll 164. The belt 163 and roll 164 are arranged to grip opposite sides of the cut tape so as to insure proper feeding and withdrawal of the tape whenever the belt 163 is moved. Figures 1, 2 and 3 may well be referred to in connection with the above as well as that which is presently to follow.

So that the operations of cutting the plies and depositing the same on the turntable 19 in proper assembly relative to one another may be properly accomplished, the tapes A, B and C are given an intermittent feed. To this end, the sprocket 59 employed to drive the bevel gear 62 is provided with a crank 167 to which is pivoted a connecting rod or pitman 168. The rear end of the pitman 168 is pivotally connected to an arm 169 carrying a rock shaft 170 journaled in bearings 171 carried by the frame 146.

The rock shaft 170 carries longitudinally spaced levers 172 from which connecting links 173 extend rearwardly and are pivotally connected at their rear ends 174 to cranks or levers 175. The levers 175 are loosely mounted on shafts 176 journaled in bearings in the frame 146. Fixed to the shafts 176 are ratchets 177 and cooperating with the ratchets 177 are pawls 178 carried by the lever arms 175. It is thus evident that as the sprocket 59 rotates, the ratchets 177 are intermittently driven in the direction indicated by the arrow.

Each of the belt rolls 165 carries a sprocket 179 about which a chain 180 is trained. Journaled in bearings carried by the I-beams 1 near the lower ends thereof is a sprocket shaft 181 carrying a sprocket 182 for each of the chains 180.

Each ratchet supporting shaft 176 has rigidly secured thereto a sprocket 183 about part of which the chain 180 engages. The chain extends upwardly from the sprocket 183, passing upwardly and forwardly over a sprocket 184 mounted to rotate with the roll 156. From the sprocket 184, the chain 180 extends forwardly and downwardly in engagement with a sprocket 185 mounted to rotate with the roll 162. The chain 180 then extends under and forwardly from a sprocket 186 carried by the frame 146, passes below and forward upwardly from a sprocket 187 mounted on a shaft 188 journalled in bearings mounted on the I-beams 1. From the sprocket 187, the chain 180 extends forwardly and upwardly to pass about the sprocket 179 as heretofore described.

It will now be seen that continued rotation of the bevel gear 62, resulting from operation of the motor 5, results in a combined oscillatory and reciprocatory movement of the pitman 168, causing, through the levers 172 and 175 and intermediate links 173, together with the ratchet and pawl structures 178 and 177, intermittent rotation of the shaft 176 and consequently of the sprocket 183. This movement occurs during substantially a half revolution of the bevel gear 62, and during the other half revolution thereof, the levers 175 are moving toward the rear of the machine (toward the right in Figures 1 and 3), and since the levers 175 are loose on the shafts 176, said levers move without causing movement of the shafts 176, the pawls 178 merely slipping over the ratchet teeth.

Each sprocket 183 drives the chain 180 and consequently causes the other sprockets 184, 185, 186, 187, 179 and 182 associated with the same chain to be rotated. By this means, the rolls 156, 162 and 165 are positively driven so as to draw the respective tapes 154 and A, B and C off the rolls 153a, 153b and 153c. The friction discs 150 and 151 and adjacent spring 152 associated with each spindle carrying a roll of alternate layers of tape are of such character as to permit the tape to be withdrawn from the roll when the chain 180 moves, and serve as a means for preventing retraction of the roller tape.

While the links 175 have been illustrated as of substantially the same size so as to cause each of the tapes A, B and C to be fed equal amounts, it is to be understood that the arms 175 may be varied as desired depending upon the amount of feed which may be desired. It is to be observed, moreover, that the forward end of each connecting link 173 may be adjusted by a screw member 189 along the lever arm 172 so as to vary the amount of rotation of the sprockets 183 for each feeding stroke of the pitman 168 and thereby vary the amount of tape to be fed to the cutting means.

Since the chains 180 are controlled by the intermittently rotating sprockets 183, it will be observed that the movement of the belt 163 about the roll 164 is likewise intermittent, and this belt cooperates with the roll 164 in withdrawing the cut tape simultaneously with the operation of feeding more of the tape to the cutting means.

Since the successive movements of the sprockets 183 are of the same duration, it will be evident that the same amount of tape will be fed to the cutting means regardless of the size of the roll 153a, 153b, or 153c.

The tapes A, B and C, after having been cut and after passing over the rolls 165, may collect in suitable bins (not shown) and constitute scrap material.

It will be observed that a stripper plate 190 is arranged so that the tape material A, B and C passes between the same and the dies. This plate is provided with openings of such size as to allow the cutters to pass therethrough, and serve to strip the tape adhering to the outer periphery of each cutter as the same is withdrawn from cooperative relation with its corresponding die.

The cutting instrumentalities are arranged to operate simultaneously, as are also the positioning rods 80, so as to deposit the plies A', B' and C' simultaneously upon the turntable 19 in an arcuate series. The cutters and rods are thereupon withdrawn and the Geneva gear mechanism operates to index the turntable 19, in the illustrated embodiment of the invention, through an angle of 60°, advancing the largest ply A' to a position directly beneath the medium size die and with its contour parallel to that of the die, and advancing the medium size ply B' likewise to a position directly below the smallest die. Thereupon a second cutting operation takes place, the newly cut plies advancing as just described. At this point, it is to be noted that the large ply A' first above referred to is now partly covered by a medium sized ply, and the medium sized ply first above referred to is now covered by the smallest sized ply. The smallest size ply originally cut has of course also advanced free of any of the dies. Thereafter another cutting operation takes place, resulting in the deposit of a large ply directly upon the turntable 19, a medium size ply upon the last previously cut large ply, and a smallest size ply upon a medium size ply which in turn had previously been deposited upon a largest size ply.

It will be evident therefore that when the machine is started, the first two of the plies C' and the first one of the plies B' are not used ultimately as a patch since they are not deposited upon a largest size ply to form a three ply patch. The second medium size ply is used however since it is deposited upon the first largest size ply which has been cut. Also, the third of the smallest size plies is employed since it is deposited upon the largest size and medium size plies which were cut in the previous two cutting operations. From this point on, each cutting operation results in the production of a three-ply patch, a partly completed patch comprising the largest and intermediate size plies, and the beginning of a patch comprising merely the largest size ply. Each patch is thus formed by three progressive cutting operations, and since the operations are simultaneous, a complete patch is produced upon each cutting operation.

The completed patches are withdrawn from the turntable 19 and collected by mechanism and in the manner now to be described.

A stub shaft 190 forming an extension of the shaft 58 is carried by the frame at one side of the machine and provides a bevel gear 191 which meshes with a larger bevel gear 192, mounted on a shaft 193 journaled in a bearing carried by the plate bracket 194 extending from one of the I-beams 1. Mounted to rotate with the shaft 193 is a sprocket 195 which, by means of the chain 196, drives a sprocket 197 carried by an arbor 198 journaled in a bearing 199 carried by the bracket 194.

Also journaled in the bracket 194 is an arbor 200 carrying a supply roll 201 preferably of fabric material. The material is in the form of a strip 202. The bevel gear shaft 193 extends through the bracket plate 194 and carries a roll 203 which rotates with the shaft. The shaft 198 also carries a roll 204 which is on the same side of the plate 194 with the roll 203 and the roll 201. The strip 202 leaves the roll 201, is trained about the roll 203, passes about a roll 205 supported by one of the I-beams 1 in brackets 206, passes over the table 19 and about a roller 207, returns to pass over an idler 208 which serves to keep that portion of the strip spaced from the portion of the strip thereunder, and is coiled onto the shaft 198 as shown at 204.

As each three-ply patch is advanced by the indexing of the turntable 19, it ultimately reaches the constantly moving strip 202 which is in effect a conveyor. The brackets 206 are preferably joined by a knife edge 209 located over the turntable 19 and close to the surface thereof so as to substantially shave the patch off the table and guide the patch onto the belt 202. The successive patches are thus deposited onto the belt 202 and carried thereby to be sandwiched between the portion of the belt on which the same rests and the previous portion of the belt which has already been wound on the roll 204. In this way, the patches are held apart from one another and collected in a convenient form. When the roll 204 has reached such a size as to have exhausted the roll 201, the said roll 204 is removed and a new roll 201 is mounted on the shaft 200 and the strip thereof trained about various rolls as above described to start the roll 204. By unwinding the completed roll 204, bearing the various three-ply patches, the said patches may be removed and then subjected to vulcanization or such other processing as will result in a completed patch ready for use in conjunction with the valve of an inner tube or for repair purposes wherever desired.

It is to be noted that the cut tapes A, B and C are withdrawn upwardly as seen in Figure 3, at a location substantially forward of the patch conveying instrumentalities so as not to interfere with one another.

An idler roll 210 carried on an arm 211 pivoted at 212 to the bracket 194 is arranged to rest on the portion of the belt 202 extending between the roll 203 and the roll 205 for the purpose of taking up slack.

The foregoing may be very briefly reviewed as follows:

The tape to be cut is preferably in the form of a fabric which is coated or impregnated with a tacky substance such as rubber, to form the lower and intermediate layers. The tape for the top layer or ply is preferably gum rubber. Each tape alternates with a carrier tape of cotton fabric or other suitable material, wound together on spiral roll. The roll is unwound so that the fabric is separated from the tape and is wound into another roll, the tape separated therefrom being conducted intermittently to the cutting instrumentalities. During the intermission between succeeding intermittent movements of the tape, the cutting instrumentalities are operated to cut a ply from the tape. The cut ply is thereupon positioned on a turntable arranged to be moved intermittently so as to conduct the cut ply away from the means which has operated to cut the same, at the completion of the cutting and positioning operations. After the positioning operation, the tape is again advanced for another cutting operation, and the portion of the tape from which the ply has been cut is at the same time withdrawn by mechanism arranged for that purpose. The cutting devices are arranged in an arcuate series coaxial with the turntable, and the table is arranged to move intermittently through an angle represented by the angle between successive cutting devices. In this manner, after each ply is deposited, the table is arranged to rotate so as to locate the ply deposited thereupon directly under the next succeeding device for the reception of the ply to be subsequently cut by such succeeding device. This of course is true of only the largest and intermediate size cutting devices, where there are but three dies as in the illustrated embodiment of the invention. It is to be appreciated, of course, that the number of dies may be varied as desired, and that each patch is completely assembled at the time the last or smallest ply is deposited.

The completed plies are withdrawn by a conveyor which is wound in a spiral roll with successive patches extending therealong and sandwiched between succeeding turns of the roll. The portions of the tape from which the plies are cut is conducted to a bin or other suitable container for the scrap or waste material.

It is to be observed that the machine operates automatically, with the various mechanisms synchronized so as to function in a predetermined timed relation to one another.

The motor 5 is of course controlled by a switch (not shown) so that the same may be started and stopped at will. The machine need not be stopped except for supplying new rolls 153a, 153b and 153c and 201, and for the removal of rolls 157 and 204.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. In a machine for making multi-ply patches, cutting devices operative simultaneously and intermittently and arranged on an arc of a circle for cutting a pair of plies, a turntable coaxial with said circle for receiving said plies, and means for indexing said turntable in timed relation to the intermittent operation of said devices so as to shift the table through the angle between said devices, whereby to advance one ply to a position to be superimposed by the next ply to be cut by the other cutting device.

2. In a machine of the class described, means for feeding a pair of strips of tape in parallelism, a cutting device for each strip and arranged to operate intermittently to cut similar elongated plies therefrom, said devices being arranged on an arc of a circle, a turntable concentric with said circle and arranged to receive the cut plies, means for indexing said turntable in timed relation to the operation of and through the angle between said devices, said devices being so arranged that the longitudinal axes of the plies when cut are in the same relation to the axis of the turntable whereby, after being indexed through said angle, the rear ply will be arranged below and with its contour parallel to that of the ply to be cut by the advance cutting device.

3. In a machine of the class described, means for stamping pieces from sheet material, a support arranged to receive said pieces, a device nonrotatable relative to said means and arranged to pass through the opening in the sheet material upon each stamping operation and engageable with the stamped piece, means for causing the piece to adhere to said device, means for moving the device toward the support so as to deposit the piece on the support without angular displacement of the piece, means for releasing the piece from said device, and instrumentalities for withdrawing said device prior to the next stamping operation.

4. In a machine of the class described, means for stamping pieces from sheet material, a support for receiving said pieces, a device engageable with each piece and movable to deposit the same on said support, instrumentalities associated with said device and operative to cause the piece to adhere to the device by suction when the piece is stamped and until the same is deposited, and to release the piece when deposited, and instrumentalities for withdrawing said device prior to the next stamping operation.

5. In a machine of the class described, means including a reciprocable element for stamping pieces from sheet material, a support for receiving the stamped pieces, mechanical means for reciprocating said element, a member for depositing the pieces onto the support, means yieldably urging said member away from said support, a pneumatic system controlled by said means in timed relation to the stamping means for causing movement of said member toward the support, said system being arranged to exert pressure on said member upon each stamping operation against the resistance of said yieldable means so as to cause said member to engage the stamped piece, at the same time exerting suction on the piece to cause the same to adhere to said member as the member is moved by pressure to a position to deposit said piece on said support, said system including means operative upon the deposit of the stamped piece and prior to the next stamping operation to release the suction and pressure so as to release the piece and enable the yieldable means to withdraw said member.

6. In a machine of the class described, a rotary member, a die, a support below the die, a cutter reciprocated by said member and arranged to cooperate with said die in stamping pieces from sheet material, a piston having a rod passing through said cutter, means for affording air pressure upon said piston to move said rod through the die so as to engage a stamped piece and deposit the same on said support, means controlled by said member and arranged to render the first means operative substantially at the completion of the stamping stroke and to render said first means inoperative by the time the cutter is to commence the next stamping stroke, and means for withdrawing said piston when the first means is rendered inoperative.

7. In a system for exerting pressure and applying suction on a member to move it in one direction and cause a stamped piece of material to adhere thereto, a source of compressed air, a cylinder, a member comprising a piston in the cylinder, a hollow piston rod for the piston, means establishing communication between said source and said cylinder for causing movement of the piston, a pair of cylinders in tandem and sealed apart, connected pistons in said pair of cylinders, means affording access of air pressure to one of said pair of cylinders so as to move the piston therein and establish a vacuum in the other of said pair of cylinders, and means establishing communication between said other cylinder and the interior of the hollow rod, whereby movement of the first piston and suction in the rod are accomplished substantially simultaneously.

8. In a system for exerting pressure and applying suction on a member to move it in one direction and cause a stamped piece of material to adhere thereto, a source of compressed air, a cylinder, a member comprising a piston in the cylinder, a hollow piston rod for the piston, means establishing communication between said source and said cylinder for causing movement of the piston, a pair of cylinders in tandem and sealed apart, connected pistons in said pair of cylinders, means affording access of air pressure to one of said pair of cylinders so as to move the piston therein and establish a vacuum in the other of said pair of cylinders, and means establishing communication between said other cylinder and the interior of the hollow rod, whereby movement of the first piston and suction in the rod are accomplished substantially simultaneously, resilient means associated with said connected pistons in opposition to the air pressure thereon, and means for closing the supply of air pressure to and exhausting the compressed air in said other cylinder so as to enable the resilient means to return said connected pistons and release the stamped piece from the first piston.

9. In a process of the class described, the steps of forming a ply, depositing the same on a support, shifting the support to bring the ply under a second ply to be formed, forming the second ply, gripping a face of the second ply at the completion of its formation and maintaining the second ply in predetermined contour relation to the first ply, and lowering the second ply while so gripping the same to deposit it in said relation to the first ply.

10. In a machine for making multi-ply patches, ply-forming devices operative simultaneously and intermittently and arranged on an arc of a circle, a turntable substantially coaxial with said circle for receiving the formed plies, and means for relatively indexing said turntable and devices in timed relation to the intermittent operation of said devices thru the angle between said devices, so as to locate one ply in a position to be superimposed by the next ply to be formed by the other device.

11. In a machine of the class described, means for feeding a pair of strips of tape, devices for cutting plies from the strips, said devices being arranged on an arc of a circle, a turntable substantially coaxial with said circle and arranged to receive the cut plies, means for relatively indexing said turntable and devices in timed relation to the operation of and through the angle between said devices, said devices being so arranged that the plies, when cut, are in predetermined relation to the axis of the turntable whereby, after each indexing operation, one ply will be arranged below and with its contour in predetermined relation to that of the next ply to be cut by the other device.

12. In a machine of the class described, means for forming pieces from sheet material, a support arranged to receive said pieces, a device non-rotatable relative to said support when said support is about to receive said pieces, for positively depositing each piece onto the support without displacement of the piece, and means for releasing the piece from said device when the piece is deposited.

13. In a machine of the class described, means for stamping pieces from sheet material, a support for receiving said pieces, a device engageable with each piece and movable to deposit the same on said support, and means associated with said device and operative to hold the piece engaged with the device by suction when the piece is stamped and until the same is deposited, and to release the piece when deposited.

14. In a machine of the class described, means for stamping pieces from sheet material, a support for receiving the stamped pieces, means for depositing the pieces onto the support, means controlled in timed relation to the stamping means and operative upon each stamping operation for effecting engagement between the depositing means and the stamped piece and maintaining such engagement until said piece is engaged with said support, and means operative upon the latter engagement to release the piece from said depositing means.

15. In a machine of the class described, means for stamping pieces from sheet material, a support for receiving the stamped pieces, means for operating said stamping means, means for depositing the pieces onto the support, means yieldably holding said depositing means away from said support, means controlled in timed relation to the stamping means and operative for moving said depositing means toward the support upon each stamping operation against the resistance of said yieldable means, for effecting engagement between the depositing means and the stamped piece, means at the same time exerting suction on the piece through said depositing means to maintain said piece engaged with said depositing means until said piece is deposited on said support, and means operative upon the deposit of the stamped piece to release the suction and consequently to release the piece from said depositing means.

16. In a machine of the class described, hollow means including cutting means for stamping pieces from sheet material, a support for such pieces, means arranged to travel in said hollow means between said cutting means and said support, and engageable with each stamped piece for depositing the same on said support, means for effecting such engagement substantially at the completion of the stamping operation and releasing the piece before completion of the next stamping operation, and means for moving said depositing means and the last mentioned means in timed relation to the stamping operations.

17. In an apparatus of the class described, mechanism for supporting and transferring a stamped piece of material, said mechanism comprising a source of compressed air, a cylinder, a member comprising a piston in the cylinder, a hollow piston rod for the piston and communicating with the atmosphere through said piston, means for establishing communication between said source and said cylinder for moving the piston, and means operative at the same time for establishing a suction in said rod to hold the piece engaged with the piston.

18. In an apparatus of the class described, mechanism for supporting and transferring a stamped piece of material, said mechanism comprising a source of compressed air, a cylinder, a member comprising a piston in the cylinder, a hollow piston rod for the piston and communicating with the atmosphere through said piston, means for establishing communication between said source and said cylinder for moving the piston, means operative at the same time for establishing a suction in said rod to hold the piece engaged with the piston, resilient means associated with said piston in opposition to the air pressure thereon, and means for closing the supply of air pressure to and exhausting the compressed air in said cylinder to render said resilient means effective to return said piston and release the stamped piece therefrom.

19. In a process of making multi-ply patches, the steps of simultaneously cutting plies of web material of progressively smaller sizes, progressing said plies and simultaneously cutting and depositing additional plies on the progressed plies so as to produce a completed patch upon each cutting operation, and holding each ply in predetermined position from the cutting operation to the deposit thereof to prevent accidental displacement thereof.

20. In a process of making multi-ply patches, the steps of cutting plies in a series, depositing the plies in said series, progressing the series of cut plies through the distance between adjacent plies, cutting a new series of plies and depositing all but the rearmost one of the new series respectively on all but the foremost one of the previous series of plies, and holding each ply in predetermined position from the cutting operation to the deposit thereof to prevent accidental displacement thereof.

21. In a process of making multi-ply patches, the steps of cutting plies of progressively smaller sizes, progressing said plies and cutting and depositing additional plies on and in predetermined relation to the progressed plies, and holding said additional plies in predetermined position during the entire depositing operation to prevent accidental displacement of said additional plies from said predetermined relation.

22. In a machine of the class described, means for stamping pieces from sheet material, a support for receiving said pieces, a device engageable with each piece and movable to deposit the same on said support, and means associated with said device and operative to hold the piece engaged with the device when the piece is stamped and until the same is deposited, and to release the piece when deposited.

23. In a machine of the class described, means for stamping pieces from sheet material, a support for receiving the stamped pieces, means for depositing the pieces onto the support, means operative upon each stamping operation for effecting engagement between the depositing means and the stamped piece and maintaining such engagement until said piece is engaged with said support, and means operative upon the latter engagement to release the piece from said depositing means.

24. In a machine of the class described, means for stamping pieces from sheet material, a support for receiving the stamped pieces, means for operating said stamping means, means for depositing the pieces onto the support, means yieldably holding said depositing means away from said support, means for moving said depositing means toward the support upon each stamping operation against the resistance of said yieldable means, for effecting engagement between the depositing means and the stamped piece, means to maintain said piece engaged with said depositing means until said piece is engaged with said support, and means operative upon the latter engagement to release the piece from said depositing means.

25. In a machine of the class described, a plurality of dies, reciprocating punches cooperating with said dies for cutting patch pieces, a support beneath said dies, means for intermittently moving said support for bringing a ply cut by one punch and die under another die, said dies having apertures through which said plies may pass and a ply engaging element for gripping a ply and extending through a punch and die for delivering a ply upon said support.

26. The herein described process of forming multi-ply patches which consists in forming a ply, gripping a face of said ply upon the formation thereof, lowering the ply onto a support, progressing said support, and forming a second ply and gripping the same upon formation thereof and lowering the same upon the first formed ply.

ARNOLD R. KRAUSE.
HOWARD O. HUTCHENS.
JULIEN F. CULLEN.
ALF C. HIRSCH.